United States Patent [19]
Imanishi et al.

[11] Patent Number: 5,651,750
[45] Date of Patent: Jul. 29, 1997

[54] DUAL CAVITY TOROIDAL TYPE CONTINUOUSLY VARIABLE TRANSMISSION

[75] Inventors: Takashi Imanishi, Yokohama; Hisashi Machida, Fujisawa, both of Japan

[73] Assignee: NSK Ltd., Tokyo, Japan

[21] Appl. No.: 513,519

[22] Filed: Aug. 10, 1995

[30] Foreign Application Priority Data

Aug. 26, 1994 [JP] Japan .................................. 6-202266

[51] Int. Cl.⁶ .................................................. F16H 15/38
[52] U.S. Cl. .................................................. 476/40; 476/45
[58] Field of Search ............................ 476/40, 41, 42, 476/45, 61, 43

[56] References Cited

U.S. PATENT DOCUMENTS

| | | | |
|---|---|---|---|
| 2,445,066 | 7/1948 | Hayes | 476/41 |
| 4,968,289 | 11/1990 | Nakano | 476/42 |
| 5,027,668 | 7/1991 | Nakano | 476/41 |
| 5,027,669 | 7/1991 | Nakano | 74/200 |

FOREIGN PATENT DOCUMENTS

| | | |
|---|---|---|
| 62-258255 | 11/1987 | Japan . |
| 2-163549 | 6/1990 | Japan . |
| 4-69439 | 3/1992 | Japan . |

*Primary Examiner*—Charles A. Marmor
*Assistant Examiner*—David M. Fenstermacher
*Attorney, Agent, or Firm*—Shapiro and Shapiro

[57] ABSTRACT

A toroidal type continuously variable transmission is arranged to support one disc on the input side, facing a pressure device, on the outer circumference of an input shaft through a needle bearing. The other disc on the input side is supported on the input shaft by means of a spline coupling and a flange. A cam board which constitutes a pressure device is supported on the outer circumference of the input shaft through a ball spline. Disc springs are installed between one face of the cam board and a loading nut. In this way, the number of difficult processing steps and the degree of required precision can be reduced at the same time, hence making it possible to implement the reduction of the manufacturing costs.

7 Claims, 5 Drawing Sheets

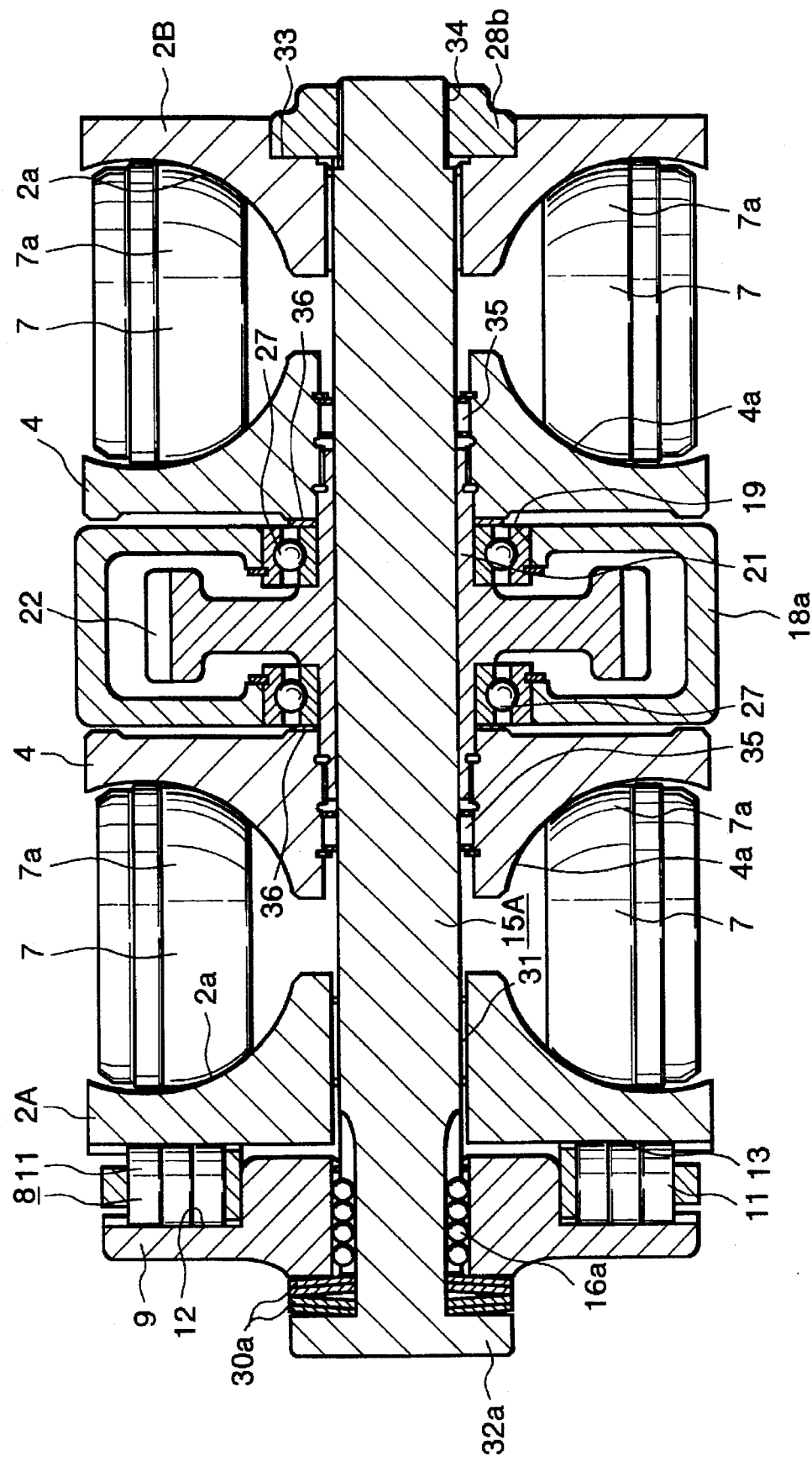

FIG. 3 *PRIOR ART*
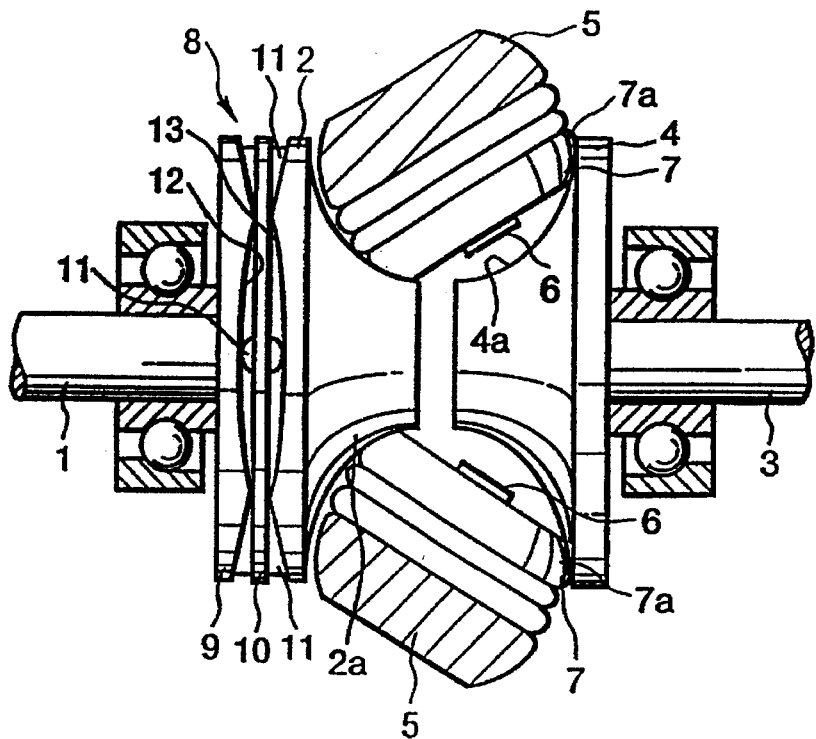
FIG. 4 *PRIOR ART*
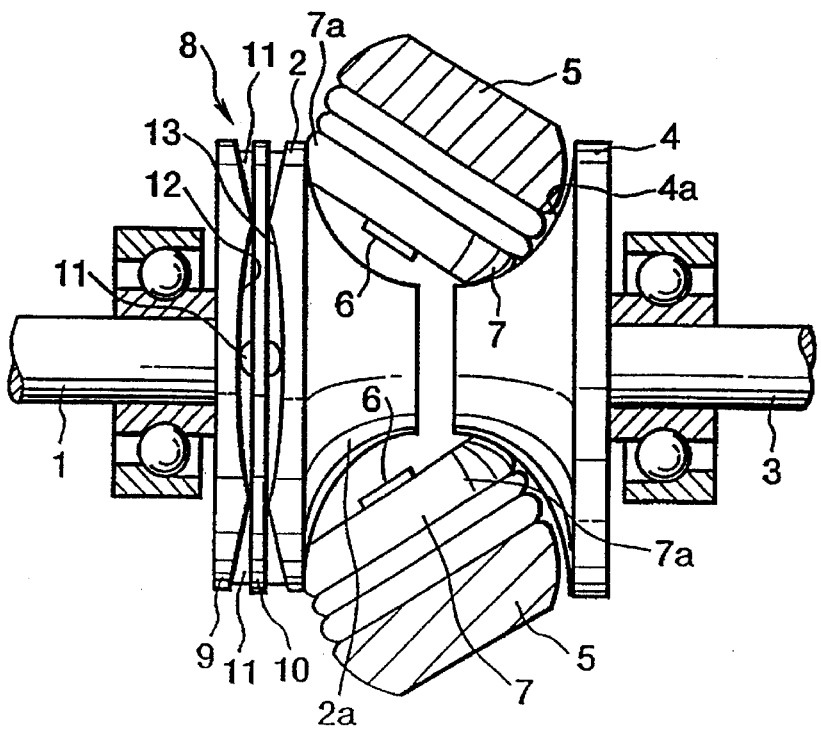

DUAL CAVITY TOROIDAL TYPE CONTINUOUSLY VARIABLE TRANSMISSION

BACKGROUND OF THE INVENTION

1. Field of the Invention

The present invention relates to a toroidal type continuously variable transmission. More particularly, the invention relates to a dual cavity type toroidal type continuously variable transmission, the supporting mode of which is improved with respect to the input shaft of discs on the input side. The toroidal type continuously variable transmission of the invention can be used as a speed change gear for an autovehicle or for various kinds of industrial machinery, for example.

2. Related Background Art

The use of a toroidal type continuously variable transmission which is schematically shown in FIG. 3 and FIG. 4 is under study as a speed change gear for an autovehicle. This toroidal type continuously variable transmission is such that a disc 2 on the input side is supported coaxially with an input shaft 1 which is supported rotatably inside the case of a speed change gear. Likewise, a disc 4 on the output side is fixed to the end portion of an output shaft 3 which is rotatably supported inside the case of the speed change gear. On the inner surface of the case having the toroidal type continuously variable transmission housed in it or on the supporting bracket provided inside the case of the speed change gear, trunnions 5 and 5 are swingably arranged centering on the pivots in the torsional positions with respect to the input shaft 1 and output shaft 3.

Each of the trunnions 5 and 5 is formed by a sufficiently rigid metallic material, and the aforesaid pivots are provided on the outer faces of both ends. Also, on the circumference of the displacement shafts 6 and 6 arranged in the central portion of each of the trunnions 5 and 5, the power rollers 7 and 7 are rotatively supported, respectively. Then, each of the power rollers 7 and 7 is pinched between the discs 2 and 4 on the input and output sides.

On each one face of the discs 2 and 4 on the input and output sides in the axial direction, where these discs face each other, the concave face 2a on the input side and the concave face 4a on the output side are formed, each section of which represents a circular toroidal curve centering on the point on the center line of the aforesaid pivot, respectively. Then, the circumferential faces 7a and 7a of the power rollers 7 and 7, each of which is formed to be a convex face providing a rotary circular surface, are arranged to abut, respectively, the aforesaid concave face 2a on the input side and concave face 4a on the output side.

Between the input shaft 1 and the disc 2 on the input side, a pressure device 8 of a loading cam type is arranged. By this pressure device 8, the disc 2 on the input side is pressed toward the disc 4 on the output side. The pressure device 8 comprises a cam board 9 which rotates together with the input shaft 1, and a plurality of rollers 11 and 11 (four rollers, for example) supported by a holder 10. On one side face (on the right side face in FIG. 3 and FIG. 4) of the cam board 9, a first cam surface 12 is formed to present concave and convex surfaces in the circular direction. At the same time, on the outer face (the left side face in FIG. 3 and FIG. 4) of the disc 2 on the input side, a second cam surface 13 is formed in the same configuration. Then, the aforesaid plural rollers 11 and 11 are arranged rotatively around axes extending in the radial direction with respect to the center of the input shaft 1. In this respect, the disc 2 on the input side can move slightly in the axial direction (the left and right directions in FIG. 3 and FIG. 4). This disc is also supported rotatively in the rotational direction.

With the rotation of the cam board 9 along with the rotation of the input shaft 1, the difference in rotational phase occurs with respect to the disc 2 on the input side. Then the plural rollers 11 and 11 are caused to ride on the first cam surface 12 and the second cam surface 13, thus causing the cam board 9 and the disc 2 on the input side to part from one another. Since the cam board 9 is supported by the input shaft 1, which is connected by a bearing to the case of the speed change gear, so as not to allow the board to move in the axial direction, the disc 2 on the input side is pressed toward the power rollers 7 and 7 while the power rollers 7 and 7 are pressed toward the disc 4 on the output side. The disc 4 on the output side is connected to the case of the speed change gear to be only rotative together with the output shaft 3, but not to be movable in the axial direction. As a result, the power rollers 7 and 7 are pressed between the disc 2 on the input side and the disc 4 on the output side. By the application of this pressing force, a pressure is generated between each of the circumferential faces of the power rollers 7 and 7 and the concave faces 2a and 4a on the input and output sides, respectively. Thus the rotation of the disc 2 on the input side is transmitted to the disc 4 on the output side through the power rollers 7 and 7 with almost no slippage. The output shaft 3 fixed to the disc 4 on the output side rotates accordingly.

When the rotating speed ratio (transmission ratio) between the input shaft 1 and output shaft 3 is changed and deceleration is performed at first between the input shaft 1 and output shaft 3, each of the trunnions 5 and 5 should swing about the respective pivot as shown in FIG. 3 to incline each of the displacement shafts 6 and 6 so that the circumferential faces 7a and 7a of the power rollers 7 and 7 abut respectively upon the portion close to the center of the concave face 2a on the input side and the portion close to the outer circumference of the concave face 4a on the output side. On the contrary, when an acceleration is performed, it is possible to obtain an intermediate transmission ratio between the input shaft 1 and output shaft 3 by swinging the trunnions 5 and 5 as shown in FIG. 4 to enable each of the displacement shafts 6, 6 to be inclined so that the circumferential faces 7a, 7a of the power rollers 7 and 7 abut respectively the portion close to the outer circumference of the concave face 2a on the input side and the potion close to the center of the convex face 4a on the output side. If the inclination angle of each displacement shaft 6 is set between those of FIG. 3 and FIG. 4, the intermediate transmission ratio between the input shaft 1 and the output shaft 3 may be obtained.

The fundamental structure and function of a toroidal type continuously variable transmission is as described above. When a toroidal type continuously variable transmission of this kind is utilized as a speed change gear for an autovehicle having an engine whose output is great, two pair of discs 2 and 4 are installed, and arranged in parallel to each other in the direction of power transmission. This has been known, for example, as disclosed in Japanese Patent Laid-Open Application Nos. 62-258255, 2-163549 and 4-69439. Of those known transmissions, FIG. 5 represents the structure disclosed in the Japanese Patent Laid-Open Application No. 4-69439.

In the structure thus disclosed, an input shaft 15 is supported only rotatively inside a housing 14. The input shaft 15 comprises a front half 15a which is coupled to the output shaft of a clutch, and others, and a rear half 15b which is made slightly rotative with respect to the front half 15a. On both ends of the rear half 15b in the axial direction (left and right directions in FIG. 5), a pair of discs 2 and 2 on the input side are supported through ball splines 16 and 16 in a state that convex faces 2a and 2a themselves are allowed to face each other. Also, on the back sides (opposite sides of the convex faces 2a and 2a on the input side in the axial direction) of the discs 2 and 2 on the input side, recesses 20 and 20 are formed in the central portion. Then disc springs 30 and 30 are provided respectively between the rear surfaces of the recesses 20 and 20 and a loading nut 28 (in the case of a recess 20 on the right-hand side in FIG. 5) or a loading plate 29 (in the case of a recess 20 on the left-hand side in FIG. 5). By each of these disc springs 30 and 30, a preliminary pressure is exerted on each of the discs 2 and 2 on the input side toward each of the discs 4 and 4 on the output side, which will be described next.

In the circumference of the intermediate portion of the aforesaid rear half 15b, a pair of discs 4 and 4 on the output side are rotatively supported with respect to the input shaft 15 in a state that each of the concave faces 4a and 4a on the output side is arranged to face each of the concave faces 2a and 2a on the input side. Also, the plural power rollers 7 and 7, which are rotatively supported by the plural trunnions through the displacement shaft 6 (FIG. 3 and FIG. 4), are pinched between each of the concave faces 2a and 4a themselves on the input and output sides. Each of the power rollers 7 and 7 incline in synchronism in order to make the transmission ratio agreeable for each of the discs 2 and 2 on the input side and the discs 4 and 4 on the output side.

Also, on the aforesaid front half 15a and the opposite portion inside the housing 14, the output shaft 17 is arranged coaxially with the rear half 15b of the input shaft 15, and is rotatively supported independent of this rear half 15b. Then, between this output shaft 17 and the pair of discs 4 and 4 on the output side, means for transmitting rotation, which will be described later, is installed to make the rotation of the discs 4 and 4 on the output side transmittable to the output shaft 17.

Inside the housing 14, a separation wall 18 is arranged on a portion between the pair of output discs 4 and 4, and then, a circularly tubular sleeve 21 is supported by a pair of roller bearings 27 and 27 inside the through hole 19 which is provided for this separation wall 18. The pair of discs 4 and 4 on the output side are coupled to both ends of this sleeve 21 by means of splines. In other words, the male splines formed on each outer circumference of both ends of the sleeve 21 are arranged to engage with the female grooves formed on each inner circumference of the discs 4 and 4 on the output side, respectively. Also, in the interior of the separation wall 18 on the intermediate portion of the sleeve 21, a first gear 22 is fixedly installed. Further, roller bearings 35 and 35 are arranged on a part of each of the discs 4 and 4 on the output side between the inner circumference of the extrusion of the sleeve 21, and the outer circumference of the input shaft 15. Each of these roller bearings 35 and 35 is arranged to allow correlated rotation and correlated displacement in the axial direction between the input shaft 15 and each of the discs 4 and 4 on the output side.

Meanwhile, inside the housing 14, a transmission shaft 23 is rotatively supported in parallel to the input shaft 15 and output shaft 17. Then an arrangement is made so that a second gear 24 fixed to one end of this transmission shaft 23 (left-hand end in FIG. 5) and the first gear 22 engage with each other directly, and that a third gear 25 fixed to the other end of the transmission shaft 23 and a fourth gear 26 fixed to the end of the output shaft 17 engage with each other through an idler gear which is not shown. With such means for transmitting rotation, the output shaft 17 rotates in the direction opposite to that of the discs 4 and 4 on the output side upon rotation of the pair of discs 4 and 4 on the output side.

Further, between the front half 15a and one (left-hand side in FIG. 5) of the discs 2 and 2 on the input side, a loading cam type pressure device 8 is installed to make it possible for this disc 2 on the input side to be freely pressed in the axial direction toward the disc 4 on the output side, which faces this disc 2 on the input side, upon rotation of the input shaft 15.

When operating the toroidal type continuously variable transmission shown in FIG. 5, which is structured as described, the pair of discs 2 and 2 on the input side rotate simultaneously upon rotation of the input shaft 15. This rotation is transmitted to the pair of discs 4 and 4 on the output side simultaneously with the same transmission ratio, thus the rotation is transmitted to the output shaft 17 by the aforesaid means for transmitting rotation. At this juncture, since the transmission of the rotational force is performed separately in the two systems arranged in parallel to each other, it is possible to make a large power (torque) transmittable. Also, by the function of the pressure device 8, the gap between the pair of discs 2 and 2 on the input side themselves tends to be narrowed when the transmission is in operation. As a result, the concave faces 2a and 2a on the input side of the discs 2 and 2 on each input side, the concave faces 4a and 4a on the output side of the discs 4 and 4 on each output side, and the circumferential faces 7a and 7a of each of the power rollers 7 and 7 are caused to abut strongly to effectuate the power transmission, efficiently. In this respect, the structure disclosed in the Japanese Patent Laid-Open Application No. 2-163549 is essentially the same as the structure shown in FIG. 5. The structure disclosed in Japanese Patent Laid-Open Application No. 62-258255 deals more with its principle and is not specific as compared with the structure shown in FIG. 5.

Now, in the case of the toroidal type continuously variable transmission which is structured to function as described above, it is desirable to improve the various aspects given below in order to reduce its costs of manufacture while securing sufficient performance and durability. In other words, for a stabilized operation of a toroidal type continuously variable transmission, it is necessary to position on the central axis of the input shaft 15 the virtual center (rotational center of each of the concave faces 2a and 2a on the input side, which presents a rotationally circular surface) of the concave faces 2a and 2a of the discs 2 and 2 on the input side, that is, the respective surface of toroidal curve. If this virtual center is displaced from the central axis even slightly, each of the concave faces 2a and 2a on the input side is caused to move eccentrically to the extent that it is displaced. If such an eccentric motion takes place, the contacting state (abutting pressure between both surfaces) of the circumferential faces 7a and 7a of the power rollers 7 and 7, and the concave faces 2a and 2a on the input side changes minutely, respectively, and then, not only vibrations occur on each of the abutting portions between both faces 7a and 2a, but the transmission efficiency of driving force is lowered between these faces 7a and 2a.

Here, in the conventional structure described above, the discs 2 and 2 on the input side are supported by the ball splines 16 and 16 on the input shaft 15, respectively. Therefore, in order to make the virtual center and the center axis agreeable, it is necessary to secure the exact precision of the ball splines 16 and 16. The dimensional errors of the female spline grooves on the inner circumferences of the discs 2 and 2 on the input side, and the male spline groves on the outer circumference of the input shaft 15 result directly in the disagreement between the virtual center and the central axis. Particularly, the dimensional precision (coaxiality) of the concave faces 2a and 2a on the input side formed on the discs 2 and 2 on the input side, as well as the female spline grooves, must be maintained exactly. Therefore, the machining of the discs 2 and 2 on the input side is extremely difficult (because of the required high precision), hence inevitably leading to the high manufacturing costs of the discs 2 and 2 on the input side. A toroidal type continuously variable transmission of the present invention is designed in consideration of these aspects.

SUMMARY OF THE INVENTION

It is an object of the present invention to provide a toroidal type continuously variable transmission comprising an input shaft; a pair of discs on the input side provided with concave faces on the input side having circular section in the radial direction on each one face in the axial direction and supported by the input shaft on the end of the input shaft in the axial direction, rotatively together with the input shaft, in a state that the concave faces on the input side are arranged to face each other; a pair of discs on the output side provided with concave faces on the output side having circular section in the radial direction on each one face in the axial direction and supported by the input shaft rotatively and movably in the axial direction of the input shaft between the pair of discs on the input side in a state that each of the concave faces on the output side is arranged to face a concave face on the input side; a plurality of trunnions swingable around pivots torsionally positioned with respect to the input shaft; a plurality of power rollers each having a rotationally circular convex face, rotatively supported by the displacement shaft which is supported by each of the trunnions, and pinched between each of the concave faces on the input and output sides; and a loading cam type pressure device for pressing in the axial direction the aforesaid one disc on the input side of the pair of the discs on the input side to the disc on the output side which faces this disc on the input side upon rotation of the input shaft, this pressure device being formed by a cam board which is rotative together with the input shaft; a first cam surface formed on the cam board; a second cam surface formed on the back side of the aforesaid one disc on the input side; and a plurality of rollers pinched between the first and second cam surfaces. In this toroidal type continuously variable transmission, the aforesaid one disc on the input side is supported by the input shaft to make it displaceable in the rotational direction and axial direction; the cam board is supported to the input shaft movably only in the axial direction through a ball spline; and the other disc on the input side is supported by the input shaft so as not to be correlatively rotative, and not to be movable, either, in the axial direction at least in the direction parting from the aforesaid one disc on the input side.

In accordance with a toroidal type continuously variable transmission of the present invention as structured above, it is possible to make the virtual center of the concave faces on the input side formed on the discs on the input side agreeable with the central axis of the input shaft without any particular machining that may require high precision, thus implementing the reduction of manufacturing costs of the discs on the input side. Also, the cam board supported by the input shaft through a ball spline can be displaced with respect to the rotational direction, but it is not allowed to transmit any driving force while rotating relative to the other members.

Therefore, even if the center of the cam board does not agree with the center of the input shaft strictly, there is no particular problem. Also, the ball spline whose processing is essentially difficult is confined to only one place, hence making it possible to implement the reduction of manufacturing costs also from this aspect.

BRIEF DESCRIPTION OF THE DRAWINGS

FIG. 2 is a cross-sectional view which shows the principal part of a second embodiment in accordance with the present invention.

FIG. 3 is a side view which shows the fundamental structure of a toroidal type continuously variable transmission in a state of its maximum deceleration.

FIG. 4 is a side view which shows the fundamental structure of a toroidal type continuously variable transmission in a state of its maximum acceleration.

DETAILED DESCRIPTION OF THE PREFERRED EMBODIMENTS

Figure 1:
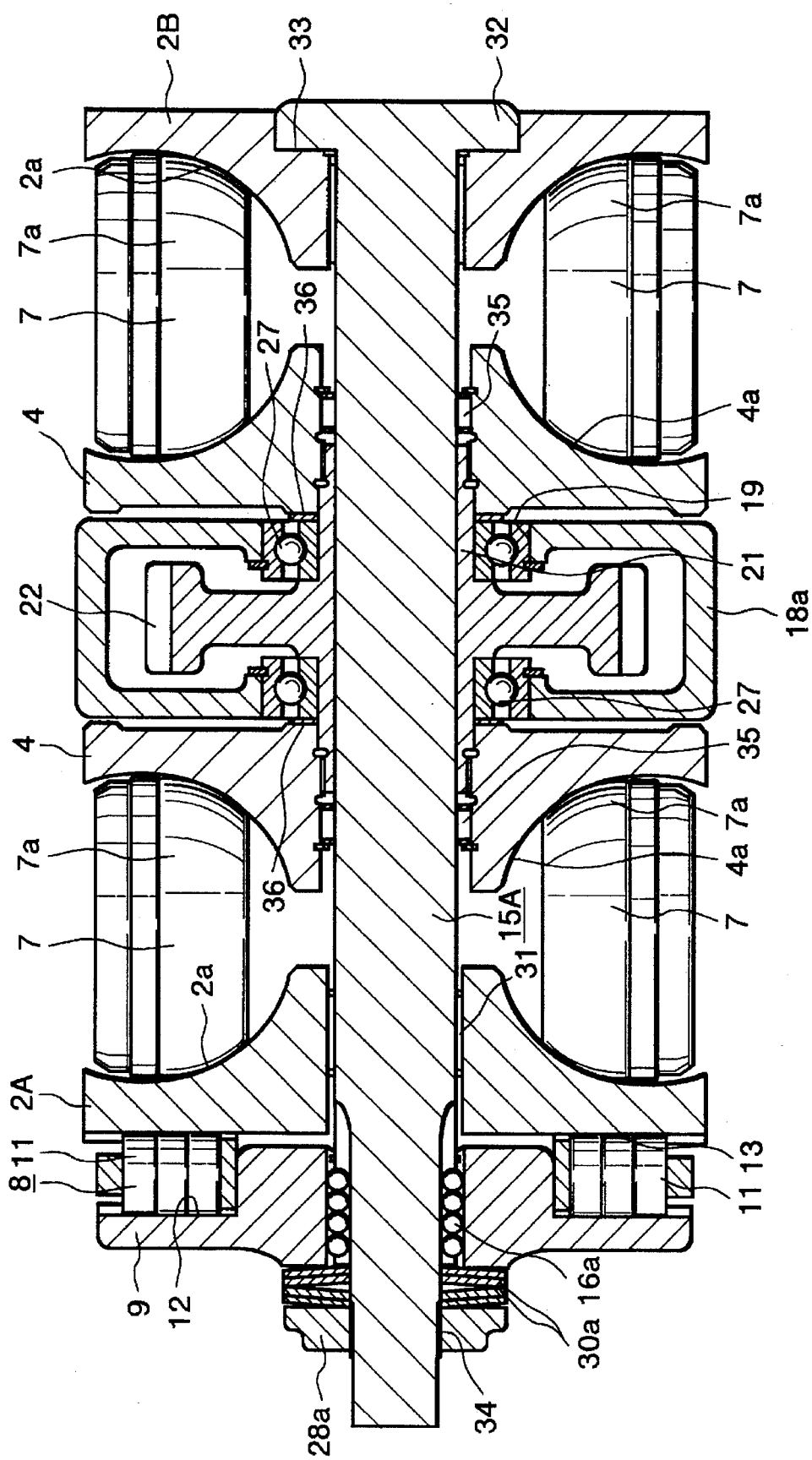
FIG. 1 is a cross-sectional view which shows the principal part of a first embodiment in accordance with the present invention.

FIG. 1 is a view which shows a first embodiment in accordance with the present invention. In this respect, the invention is featured in that the structure of a supporting portion is devised to be arranged for a pair of discs 2A and 2B on the input side, and a cam board 9 on the circumference of an input shaft 15A, hence making it unnecessary to carry out any particular machining exactly with a high precision, thereby reducing costs of manufacture. Here, the structure and function of any other parts are substantially the same as those of the conventional structure as described above. Therefore, the description will be omitted or made brief as to the same elements so as to avoid any repetition. Hereunder, the description will be made centering on the aspects presenting the features of the invention. Also, for simplification, the trunnions 5 (see FIG. 2 and FIG. 3) are omitted in FIG. 1.

On the circumference of the intermediate portion of the input shaft 15A close to the one end (left-hand end in FIG. 1), one of the discs 2A on the input side is arranged coaxially with the input shaft 15A, and then, a needle bearing 31 is installed between the inner circumference of the disc 2A on the input side and the outer circumference of the input shaft 15A. Therefore, this one disc 2A on the input side is supported to be displaceable in the rotational and axial directions (left and right directions in FIG. 1) with respect to the input shaft 15A.

Also, on the other end of the input shaft 15A (right-hand end in FIG. 1), the other disc 2B on the input side is supported so as not to be rotative with respect to the input shaft 15A, and not to be movable, either, in the axial direction away from the one disc 2A on the input side. In other words, an annular flange 32 of an external flange type is formed on the other end of the input shaft 15A, and then, one side face (left-hand side in FIG. 1) of this flange 32, and the back side (right-hand side in FIG. 1) of the disc 2B on the input side on the other end are caused to abut each other. Also, the outer circumference of the input shaft 15A on the other end, and the inner circumference of the other disc 2B on the input side are coupled by means of a spline. In this way, it is possible to prevent the input shaft 15A and the other disc 2B on the input side from rotating relative to each other. Here, in accordance with the embodiment shown in FIG. 1, the flange 32 is circular and is fitted in the circular recess 33 formed in the central portion of the back face of the other disc 2B on the input side. The presence of such a recess 33 is effective in making the dimension smaller in the axial direction of the toroidal type continuously variable transmission. However, in terms of the functional enhancement, this recess is not necessarily needed.

Figure 6:
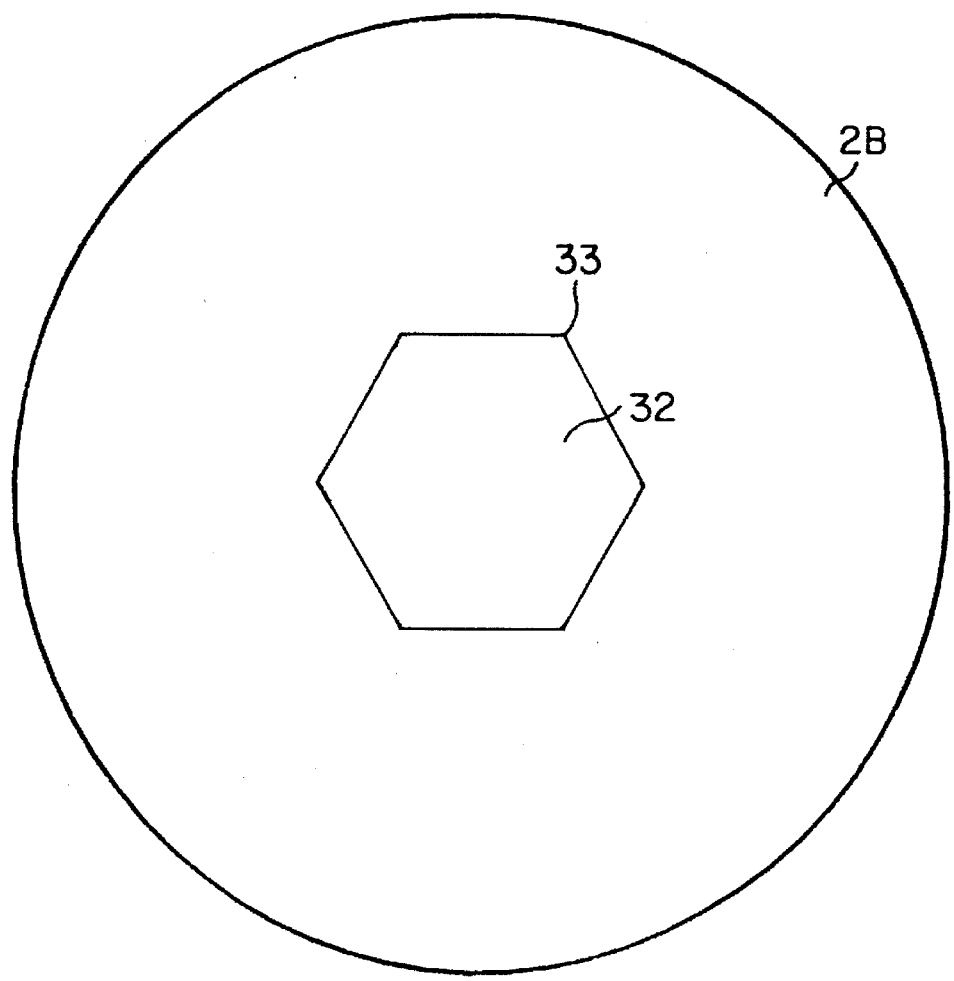
FIG. 6 is an end view which shows a flange and recess in accordance with the present invention.

However, if the flange 32 and recess 33 are formed in a shape other than a circle such as a quadrilateral or a hexagon (see FIG. 6), and then, these parts are fitted to each other without any looseness, it is possible to omit the splined coupling between the outer circumference of the input shaft 15A on the other end, and the inner circumference of the other disc 2B on the input side. Such a structure formed by a non-circular fitting to prevent rotation can be utilized effectively if the provision of the splined coupling is difficult.

Also, the cam board 9 constituting the loading cam type pressure device 8 is supported by the outer circumference of the input shaft 15A on one end through the ball spline 16a so that it can move only in the axial direction. Also, a male thread 34 is formed on an extrusion from the back face (the surface opposite to the first cam surface 12, that is, the left-side face in FIG. 1) of the cam board 9. On this male thread 34, a loading nut 28a is screwed, and then, disc springs 30a and 30a serving as a kind of elastic member are installed between one face (right-side face in FIG. 1) of the loading nut 28a and the back face of the cam board 9. By the elasticity of the disc springs 30a and 30a, the cam board 9 is pressed toward the aforesaid one disc 2A on the input side. The disc springs 30a and 30a remove any backlash that may be derived from the pressure device 8, and also, function to keep each of the concave faces 2a and 4a on the input and output sides, and the circumferential faces 7a and 7a of the power rollers 7 and 7 in contact with each other. In this respect, as an elastic member, it may be possible to use compressed coil springs or other kinds of springs, rubber, elastomer, or the like, besides the disc springs 30a shown in FIG. 1. The position of the elastic member is not limited to the one indicated in the embodiment shown in FIG. 1, either. For example, this member may be placed between one face of the flange 32 and the bottom face of the recess 33. Essentially, it should be good enough as long as elastic members are arranged in series between the loading nut 28a and flange 32 so that each of the concave faces 2a and 4a, and the circumferential faces 7a and 7a described above can abut each other elastically. Therefore, it may be possible to provide elastic members in place of spacers 36 and 36 between the end face of inner ring of each of the roller bearings 27 and 27 supporting the sleeve 21 to be described next, and the back faces of both discs 4 and 4 on the output side.

Figure 5:
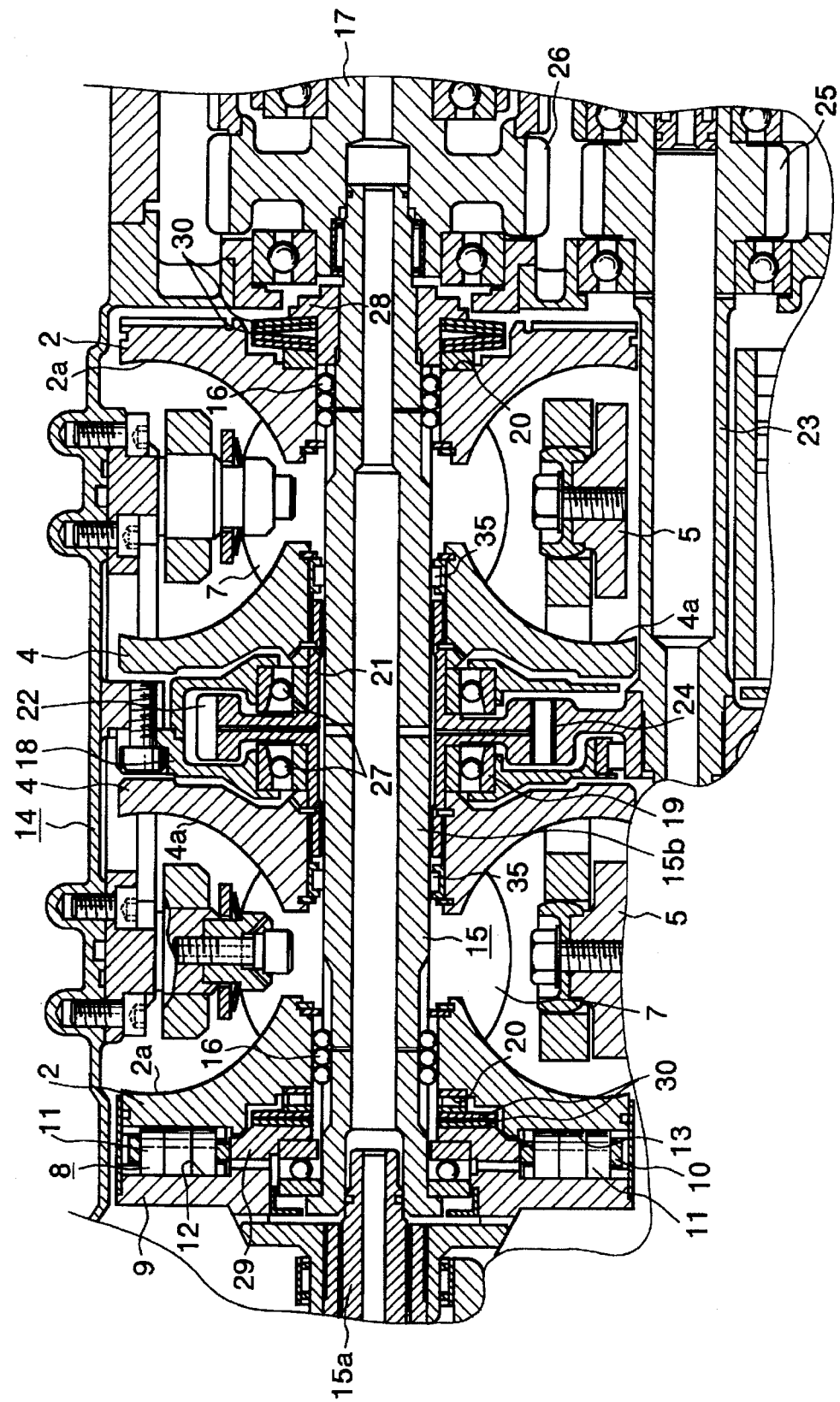
FIG. 5 is a cross-sectional view which shows the specific structure of a toroidal type continuously variable transmission in accordance with the prior art.

Also, the pair of discs 4 and 4 on the output sides are supported on the circumference of the intermediate portion of the input shaft 15A by the same structure as the conventional toroidal type continuously variable transmission which is shown in FIG. 5. Therefore, these discs 4 and 4 on the output side are rotative with respect to the input shaft 15A and displaceable with respect to the input shaft 15A in the axial direction. Then, through the first gear 22 fixed to the circumference of the intermediate portion of the sleeve 21 coupled to both ends of these discs 4 and 4 on the output side, it is possible to draw its rotational force freely. This first gear 22 is rotatively installed in the hollow separation wall 18a arranged inside the housing 14 (see FIG. 5).

When operating the toroidal type continuously variable transmission of the present invention structured as described above, the gap between the one disc 2A on the input side and the cam board 9 is widened following the action of the pressure device 8 upon rotation of the input shaft 15A. Then, toward the disc 4 on the output side, this one disc 2A is pressed in the right-hand direction in FIG. 1. At the same time, the cam board 9 presses the input shaft 15A in the left-hand direction in FIG. 1 by means of the disc springs 30a and 30a and the loading nut 28a. Thus the flange 32 formed on the other end of the input shaft 15A presses the other disc 2B on the input side in the left-hand direction in FIG. 1. As a result, the gap between the pair of input discs 2A and 2B tends to be narrowed, and the concave faces 2a and 2a on the input side of each of the discs 2A and 2B on the input side, the concave faces 4a and 4a on the output side of each of the discs 4 and 4 on the output side, and the circumferential faces 7a and 7a of the power rollers 7 and 7 are caused to abut each other with great force. In this way, it is possible to efficiently transmit the rotational force from the input shaft 15A to the sleeve 21 to which the first gear 22 is fixed.

Particularly, in accordance with the toroidal type continuously variable transmission of the present invention, the virtual center of the concave faces 2a and 2a on the input side formed on the pair of discs 2A and 2B on the input side can be made agreeable with the central axis of the input shaft 15A without any particular machining that may require high precision, thus implementing the reduction of manufacturing costs of discs 2A and 2B on the input side. Now, the reasons why this cost reduction is possible will be given below.

Firstly, since such one disc 2A on the input side is supported by the circumference of the input shaft 15a through the needle bearing 31, the inner circumference of the disc 2a on the input side simply presents a cylindrical face. As a result, compared to the case where a female spline groove should be formed on this inner circumferential face for use with ball splines, it is much easier to carry out a required processing to enable the center of this inner circumferential face to agree with the virtual center of the concave face 2a on the input side.

Secondly, the other disc 2B on the input side is supported on the circumference of the input shaft 15A by means of spline coupling. This spline coupling should be good enough if it merely prevents the rotation of the disc 2B on the input side with respect to the input shaft 15A. This is not like the one which allows displacement in the axial direction as the ball splines 16 and 16 in the conventional structure (see FIG. 5). Consequently, there is no need for requiring a strict precision in the formation of the female spline groove to effectuate this spline coupling. Hence, compared to the case where a female spline groove is processed on the inner circumferential face of the other disc 2B on the input side, it is much easier to carry out processing needed for making the center of this inner circumferential face agreeable with the virtual center of the concave face 2a on the input side. Moreover, in an extreme case, if the function of the disc 2B on the input side is only to prevent rotation with respect to the input shaft 15A, there is no problem even when the disc 2B on the input side has slight play that may result in a displacement in the diametral direction with respect to the input shaft 15A. With such slight play, the center of the inner circumference of the other disc 2B on the input side and the virtual center of the concave face 2a on the input side can agree with each other automatically when a toroidal type continuously variable transmission is assembled and operated. Therefore, the allowable range of precision becomes wider, thus making it possible to implement a further reduction of manufacturing costs.

Also, in accordance with the structure of the present invention, a ball spline 16a is installed between the inner circumference of the cam board 9 and the outer circumferential face of the input shaft 15A to compensate for the omission of the ball splines 16 and 16 between the inner circumferential face of each of the discs 2A and 2B on the input side and the input shaft 15A (see FIG. 5). This cam board 9 can be displaced in the rotational direction with respect to the rollers 11 and 11, but there is no possibility that it transmits any driving force while correlatively rotating with the other members. Consequently, even if the center of this cam board 9 and the center of the input shaft 15A do not agree with each other strictly, there is no particular problem. Here, the provision of a ball spline whose processing is difficult irrespective of the required precision is now reduced from two as in the conventional structure to one. From this aspect, too, it is possible to implement the reduction of manufacturing costs.

Now, FIG. 2 is a view which shows a second embodiment in accordance with the present invention. In this embodiment, a flange 32a is formed on one end of the input shaft 15A (on the left end in FIG. 2), and then, disc springs 30a and 30a are installed between one face (right-side face in FIG. 2) of the flange 32a and the back face of the cam board 9. Also, a male thread 34 is formed on the other end of the input shaft 15A (right-hand end in FIG. 2). On this male thread 34, a loading nut 28b is screwed. A part of this loading nut 28b is fitted to the recess 33 which is formed on the back face of the disc 2B on the input side. As a result, the part of the loading nut 28b and recess 33 present a circle. The loading nut 28b is tightened using a wrench that can be coupled with the non-circular portion which is formed on the remaining part of the loading nut 28b (right-hand half in FIG. 2). The other structures and functions are the same as those referred to in the first embodiment described above. Therefore, while applying the same reference marks to the equivalent parts, the description thereof will be omitted to avoid any repetition.

In this respect, it may be possible to arrange the relationship between the flange and recess on the disc on the input side in the first and second embodiments, and the relationship between the loading nut and recess on the disc on the input side as given below.

In other words, the flange and loading nut are configured to be circular or non-circular in each of the embodiments when observed in the axial direction, but it should be good enough if the configurations of the flange and loading nut and that of the recess on the disc on the input side merely have a complementary relationship. Therefore, it may be possible to make the configurations an I-shape, cross(+) shape, or the like, and not necessarily a quadrilateral or a hexagon. In this case, too, it is possible to regulate the correlative movement and rotation in the axial direction with respect to the input shaft of the disc on the input side.

The toroidal type continuously variable transmission of the present invention is structured to function as described above, thus making it possible to transmit a large driving force, but rarely generate vibrations when it is in operation. Also, it is made possible to manufacture a toroidal type continuously variable transmission having good efficiency of transmission and sufficient durability at low costs of manufacture.

What is claimed is:

1. A toroidal type continuously variable transmission comprising:

a rotatable input shaft;

a pair of input discs each having a concave face with a cross-section substantially in the shape of a circular arc, said pair of input discs being connected to said input shaft such that said concave faces face each other;

a pair of output discs each having a concave face with a cross-section substantially in the shape of a circular arc, said pair of output discs being connected to said input shaft so as to be rotatable relative to said input shaft and movable along an axis of said input shaft, said output discs being disposed between said pair of input discs such that each of said concave faces on the output discs faces a corresponding one of the concave faces on the input discs;

a plurality of trunnions swingable around respective axes transverse to said input shaft;

a plurality of displacement shafts each mounted on a respective one of said plurality of trunnions;

a plurality of power rollers, each having a peripheral surface substantially in the shape of a portion of a sphere, and each being rotatively supported by a corresponding displacement shaft, and being in contact with the concave faces on a corresponding pair of input and output discs; and a loading cam type pressure device for pressing one of said input discs along the axis of said input shaft toward a corresponding output disc upon rotation of said input shaft, said pressure device including a cam member which is non-rotatable relative to said input shaft and has a first cam surface, a second cam surface formed on a back face of said one input disc, and a plurality of rollers disposed between said first and second cam surfaces, wherein said one input disc is supported on said input shaft so as to be rotatable relative to said input shaft and movable along the axis of said input shaft; said cam member is supported on said input shaft through a ball spline so as to be non-rotatable relative to said input shaft and movable along the axis of said input shaft; and the other input disc is supported on said input shaft so as to be non-rotatable relative to said input shaft and non-movable along said axis of said input shaft in a direction away from said one input disc.

2. A toroidal type continuously variable transmission according to claim 1, wherein a flange extending outwardly from said input shaft in a radial direction thereof is integrally formed on one end of said input shaft and received in a complementary recess formed on a back face of said other input disc so as to prevent movement of said other input disc away from said one input disc.

3. A toroidal type continuously variable transmission according to claim 2, wherein said flange and said recess are non-circular, and cooperate such that said other input disc is non-rotatable relative to said input shaft.

4. A toroidal type continuously variable transmission according to claim 2, wherein an outer circumferential face of said input shaft and an inner circumferential face of said other input disc are non-rotatably coupled by a spline.

5. A toroidal type continuously variable transmission according to claim 2, wherein said flange and said recess are polygonal, and cooperate such that said other input disc is non-rotatable relative to said input shaft.

6. A toroidal type continuously variable transmission according to claim 1, wherein a loading nut is screwed on one end of said input shaft and received in a complementary recess formed on a back face of said other input disc so as to prevent movement of said other input disc away from said one input disc.

7. A toroidal type continuously variable transmission according to claim 6, wherein an outer circumferential face of said input shaft and an inner circumferential face of said other input disc are non-rotatably coupled by a spline.

* * * * *